United States Patent
Serizawa et al.

(10) Patent No.: US 6,462,279 B1
(45) Date of Patent: Oct. 8, 2002

(54) WIRING STRUCTURE OF FLAT CIRCUIT FOR VEHICLE

(75) Inventors: Yasuyoshi Serizawa, Shizuoka (JP); Kenji Iwasaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 25 days.

(21) Appl. No.: 09/625,956

(22) Filed: Jul. 26, 2000

(30) Foreign Application Priority Data

Jul. 29, 1999 (JP) ............................................. 11-215752

(51) Int. Cl.⁷ ................................................. H01B 3/00
(52) U.S. Cl. ................................ 174/72 A; 174/72 TR; 439/34
(58) Field of Search .............................. 174/72 A, 68.3, 174/72 R, 99 R, 72 TR, 101; 361/826; 296/146.1; 439/34

(56) References Cited

U.S. PATENT DOCUMENTS 5,168,904 A * 12/1992 Quinkert .................... 140/92.1
6,053,758 A * 4/2000 Kato et al. .................. 439/364
6,135,538 A * 10/2000 Serizawa et al. .......... 296/146.7
6,245,997 B1 * 6/2001 Serizawa et al. .......... 174/72 A

FOREIGN PATENT DOCUMENTS

JP          9-309390          12/1997
JP          10-236241          9/1998

* cited by examiner

Primary Examiner—Dean A. Reichard
Assistant Examiner—W. David Walkenhorst
(74) Attorney, Agent, or Firm—Morgan, Lewis & Bockius LLP (57) ABSTRACT

A first flat circuitry is provided with a standard circuit for connecting a standard electric appliance to be mounted on a door trim and an electric appliance on a door panel via a wire harness connector. A second flat circuitry is separately provided with an optional circuit for connecting an optional electric appliance to be mounted on the door trim and the electric appliance on the door panel side via the connector. A casing of a main switch unit, one of the standard electric appliances is provided with a mounting section having a connector fitting part to be fitted with the connector, which exposed conductor parts of the plurality of the circuitries and terminals of the connector connected at the connector fitting part.

18 Claims, 8 Drawing Sheets

WIRING STRUCTURE OF FLAT CIRCUIT FOR VEHICLE

BACKGROUND OF THE INVENTION

The present invention relates to a flat circuit wiring structure for installing a flat circuit having a circuit for electrically connecting an electric appliance mounted on a molded panel, such as a door trim and an instrument panel of a vehicle with another electric appliance mounted on a door panel or a vehicle body side via a wire harness connector.

In general, a main switch unit including a power window switch for operating opening/closure of a window glass, and a door mirror switch, and a plurality of electric appliances such as a courtesy lamp to be turned off when the door is closed and to be turned on when the door is opened are mounted on a door trim of a vehicle door as the standard components. As an electric appliance on the door panel side to be electrically connected with the standard electric appliances, a door control unit having a power window control function for vertically moving the window glass by controlling a power window motor according to an up/down signal outputted from the power window switch, and a courtesy lamp control function for turning on/off a courtesy lamp according to the output of a switch to be on/off according to opening/closure of the door can be presented. Moreover, as optional electric appliances to be optionally mounted on the door trim, optional switches such as a power seat switch for adjusting the position and angle of seats by driving a motor, a memory switch for storing the adjusted position and angle of the seats, a fuel cover opener switch, and a trunk cover opener switch can be presented. Furthermore, in the case of high grade vehicles, the optional switches such as the power seat switch are included in the standard components to be mounted on the door trim.

Figure 7:
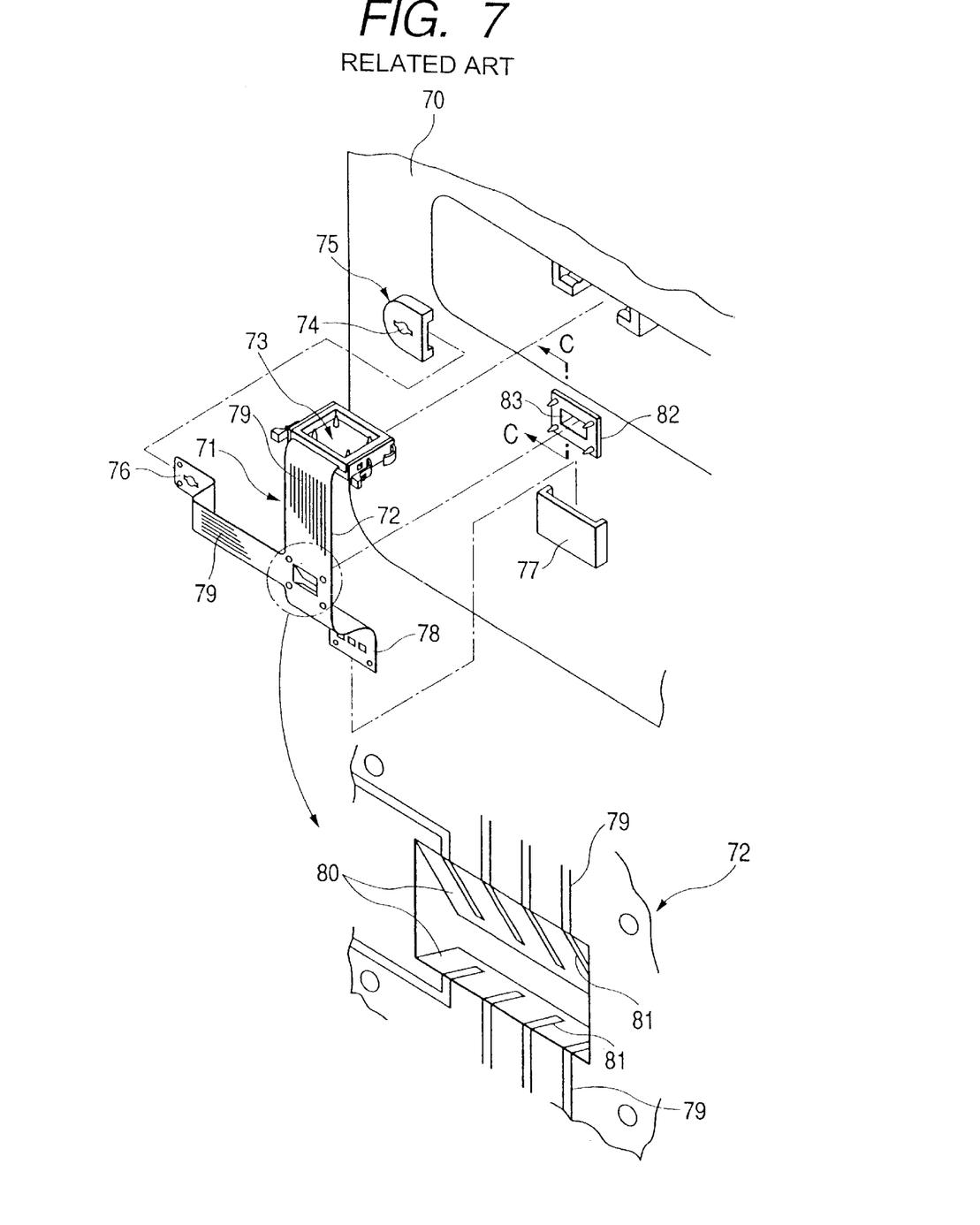
FIG. 7 is a perspective view of a related wiring structure.
Figure 8:
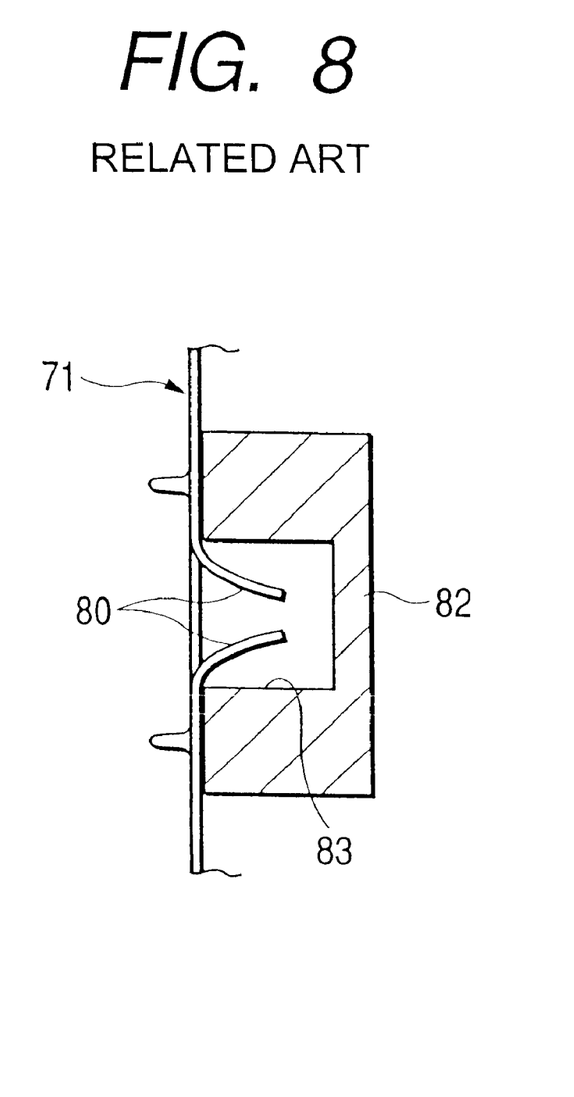
FIG. 8 is a cross-sectional view taken along the line C—C of FIG. 7, showing a connecting section of a flat circuit with respect to a connector part on a door panel side in the related wiring structure.

FIG. 7 shows a related structure comprising a flat circuit for electrically connecting the electric appliances on the door trim side and the electric appliances on the door panel side (disclosed in Japanese Patent Publication No. 9-309390A). In the related structure, a flexible printed circuit board 72 of a flat circuit 71 to be mounted on a door trim 70 of a vehicle door is provided with a connecting section 73 to be connected with a main switch unit including a power window switch, a lamp connecting section 76 to be connected with a bulb of a courtesy lamp mounted on a lamp holder 75 having a bulb mounting hole 74, and a printed circuit 79 having a connecting section 78 to be connected with optional switches such as a power seat switch to be mounted on a holder 77. Tongue-like connecting sections 80 leading to the circuit 79 are formed in the middle part of the flexible printed circuit board 72. As shown in the part enlarged in FIG. 7, the connecting sections 80, which are formed by notching and bending the flexible printed circuit board 72, have an exposed conductor part 81 elongating to the circuit 79. As shown in FIG. 8, the connecting sections 80 are inserted into a recess part 83 of an insulating resin connector housing 82 assembled in the door trim 70. The connector housing 82 having a clip insertion hole (not illustrated) is fixed on the door trim 70 by a push-in clip. With the connecting sections 80 inserted in the recess part 83 of the connector housing 82 as shown in FIG. 8, a connector part of a control board provided on the inner panel side (not illustrated) is inserted in the recess part 83 so as to electrically connect terminals of the connector part and the exposed conductor parts 81 of the connecting sections 80.

However, according to the above-mentioned related structure, since the exposed conductor parts 81 of the connecting sections 80 and the connector part of the control flexible board on the inner panel side are connected, using the terminals (connecting sections 80) of the circuit 79 of the circuit 71 without providing a terminal in the flat circuit 71, the connector housing needs to be provided on the rear face of the door trim 70. In this case, a high fitting accuracy is required to the recess part 83 of the connector housing 82 with respect to the connector part of the control flexible board. However, since it is difficult to mold the large size resin door trim 70 with a high accuracy, the connector housing 82 needs to be produced independently from the door trim 70. Accordingly, the number of parts is increased so as to soar the production cost.

Moreover, in the related structure, in addition to the connecting section 73 to be connected with the main switch unit and the lamp connecting section 76, the optional switch connecting section 78 to be connected with the optional switches such as power seat switch is formed integrally with the flexible printed circuit board 72 of the flat circuit 71. Therefore, the flexible printed circuit board 72 is bulky and the cost is increased therefor. Furthermore, in the case of vehicles without having the optional switches such as the power seat switch, the switch circuit face of the optional switch connecting section 78 without a counterpart to be connected should be protected at the time of or after assembling the flat circuit 71 on the door trim 70. In order to avoid the inconveniences, it is conceivable to provide the flat circuit having the optional switch circuit and connecting section independently from the flat circuit having the connecting section 73 to be connected with the main switch unit and the lamp connecting section 76. However, in the case of merely dividing the flat circuit in two, the terminal parts of the two flat circuits and the door wire harness are connected respectively in vehicles with the optional switches mounted, two connecting points are required. Therefore, two pieces of the connector housings 82 to be provided in the door trim 70 are needed so as to increase the number of parts as well as to increase the number of steps of the work, resulting in the cost rise.

SUMMARY OF THE INVENTION

In light of these related problems, a first object of the invention is to provide a wiring structure of a flat circuit for a vehicle capable of eliminating a connecting section on the molded panel side for connecting a flat circuit installed on the molded panel and a wire harness for reducing the cost. Moreover, a second object of the invention is to provide a wiring structure of a flat circuit for a vehicle capable of capable of connecting a plurality of flat circuits and a wire harness at one point without increasing connecting sections for reducing the cost.

In order to achieve the above objects, according to the present invention, there is provided a wiring structure for a vehicle, comprising:

at least one first electric appliance provided on a molded panel in the vehicle;

at least one second electric appliance provided on the molded panel;

a connector provided with terminals to which wire harnesses are connected;

a mount section provided on the molded panel and including a polygonal insertion hole into which the connector is inserted;

at least one first flat circuit including a first connecting portion connected to the first electric appliance, and a second connecting portion attached on at least one of inner walls of the polygonal insertion hole while exposing conductors of the circuit; and at least one second flat circuit a first connecting portion connected to the second electric appliance, and a second connecting portion attached on at least one of another inner walls of the polygonal insertion hole while exposing conductors of the circuit.

The first and second electric appliances are electrically connected via the connector when the connector is inserted into the insertion hole by contacting the respective terminals with the respective exposed conductors. Preferably, the first electric appliance is an electric appliance provided standardizedly and the second electric appliance is an electric appliance provided optionally. The first flat circuit includes a standard circuit for the first electric appliance and the second flat circuit includes a optional circuit for the second electric appliance.

Preferably, the mount section includes a mount face surrounding the insertion hole. The respective second connecting portions of the first and second flat circuits are provided with a slit for defining a foldable portion on which the conductor is exposed. The respective second connecting portions of the first and second flat circuits are laminatedly attached on the mount face, and then the respective foldable portions are folded into the respective inner walls of the insertion hole to be attached thereon.

In this case, since it is not necessary to provide the mount section independently from the molded panel, the cost can be reduced.

In addition, the flat circuit is divided for the standard component and the optional component so as to achieve a small size of the standard flat circuit as well as the protection of a connecting portion for the optional component can be eliminated. Furthermore, a plurality of the flat circuits and the wire harness can be connected at one point without the need of adding a connecting section, and thus the cost reduction can be achieved.

Still further, the exposed conductors of both flat circuits and the terminals of the wire harness connector can be connected easily.

Preferably, a plurality of bosses fit with a plurality of through holes formed on the respective second connecting portions of the first and second flat circuits.

In this case, the exposed conductors of both circuits can be connected certainly with the terminals of the connector at the correct position.

Preferably, a retaining member is formed on the respective bosses for retaining the respective second connecting portions of the first and second flat circuits onto the mount face.

In this case, the connecting sections of both circuits can be assembled on the mount face certainly.

Preferably, a first retaining member is provided on the connector. A second retaining member engaged with the first retaining member is provided on a part of the inner walls of the insertion hole to retain the connector inside the insertion hole.

In this case, the connector can be assembled on the mount section certainly.

Preferably, the mount section is provided as a part of a main switch unit mounted on a door trim of the vehicle. The first electric appliance includes a courtesy lamp unit and a door control unit mounted on a door panel of the vehicle for opening/closing a window glass in accordance with a window open/close signal generated by operating a power window switch provided with the main switch unit.

Preferably, the first flat circuit includes signal lines for carrying the window open/close signal to the door control unit, and a power supply line for electrically connecting the courtesy lamp unit with an associated terminal of the connector.

In this case, the first flat circuit connected with the main switch unit can be small. The exposed conductors of the plural flat circuits and the terminals of the connector can be connected at one point. Further, the mount section can be produced integrally with the main switch unit with a good accuracy without the need of producing a connecting member independently from the door trim.

Preferably, the courtesy lamp unit includes a bulb, and a lamp body integrally formed with the door trim while including an insertion hole into which the bulb is inserted and a mount face on which the first connecting portion of the first flat circuit is attached. A plurality of bosses are protruded from the mount face, which are fit with a plurality of through holes formed on the first connecting portion.

In this case, the number of parts and the number of steps of work can eliminated for the lamp body so as to reduce the cost. Moreover, the first connecting section of the first flat circuit can be positioned and assembled in the lamp body.

Preferably, a retaining member is formed on the respective bosses for retaining the first connecting portion of the first flat circuit onto the mount face.

In this case, the first connecting section of the first flat circuit can be assembled certainly on the lamp body.

Preferably, the first flat circuit includes a main circuit section extending from the second connecting portion to a third connecting portion connected with the main switch unit, and a lamp circuit section branchingly extending from the second connecting portion to the first connecting portion.

In this case, the main circuit section can be shortened so that the first flat circuit can be small as a whole.

Preferably, a plurality of bosses fit with a plurality of through holes formed on the lamp circuit section are protruded from the door trim on which the lamp circuit section is disposed.

In this case, the lamp circuit section is positioned and assembled on the door trim.

Preferably, the second electric appliance includes an optional switch unit provided with a power seat switch.

Preferably, a plurality of bosses fit with a plurality of through holes are formed on the second flat circuit are protruded from a door panel on which the second flat circuit is disposed.

In this case, the second flat circuit is positioned and assembled on the door trim.

Preferably, side walls are formed on the mount face of the mount section so as to situate both sides of the respective second connecting portions of the first and second flat circuits.

In this case, lift-off of the first flat circuit or both circuits due to contact of both side portions thereof with a finger of a worker can be prevented.

Preferably, side walls are formed on the mount face of the lamp body so as to situate both sides of the first connecting portion of the first flat circuit.

In this case, lift-off of the first connecting section of the first flat circuit due to contact of both side portions thereof with a finger of a worker can be prevented.

Preferably, side walls are formed on the door trim so as to situate both sides of the lamp circuit section.

In this case, lift-off of the lamp circuit section due to contact of both side portions thereof with a finger of a worker can be prevented.

Preferably, side walls are formed on the door panel so as to situate both sides of the second flat circuit.

In this case, lift-off of the second flat circuit due to contact of both side portions thereof with a finger of a worker can be prevented.

DETAILED DESCRIPTION OF THE PREFERRED EMBODIMENTS

Figure 1:
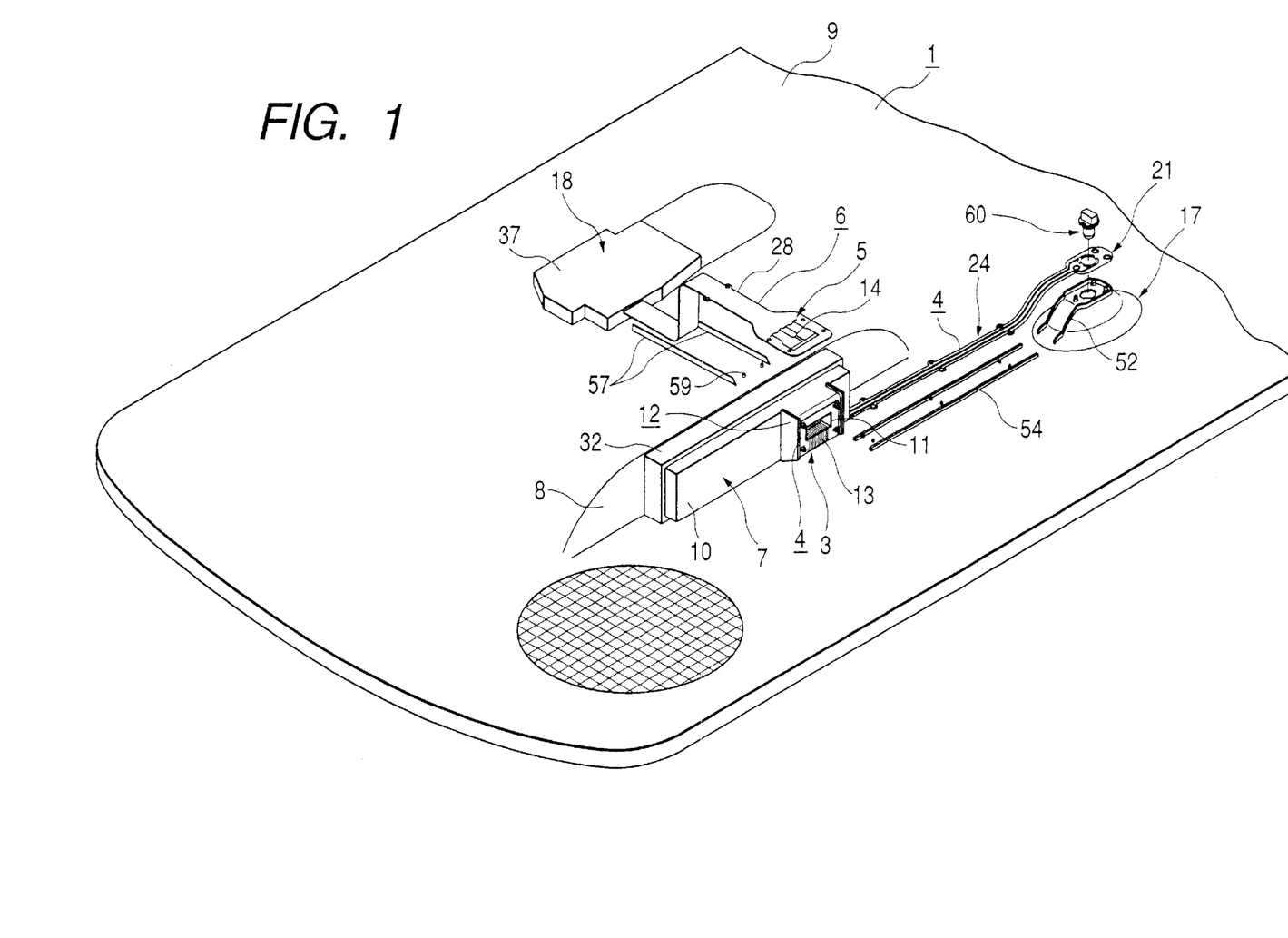
FIG. 1 is a perspective view of a door trim viewed from the rear face side, showing the entire configuration of a structure wiring a flat circuit for a vehicle according to one embodiment of the invention.
Figure 2:
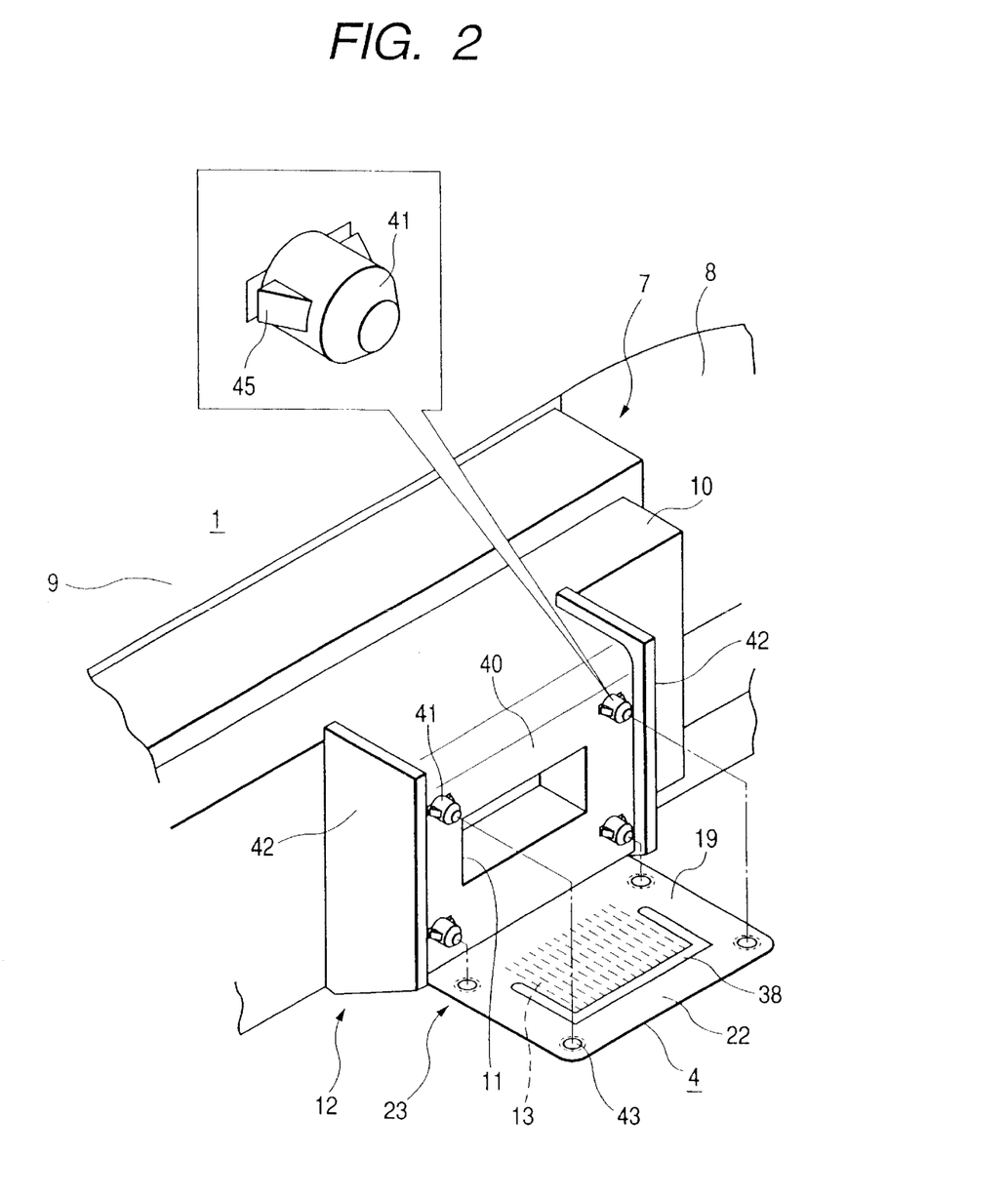
FIG. 2 is a perspective view showing the wiring structure of a first flat circuit as a partial enlarged view of FIG. 1.
Figure 3:
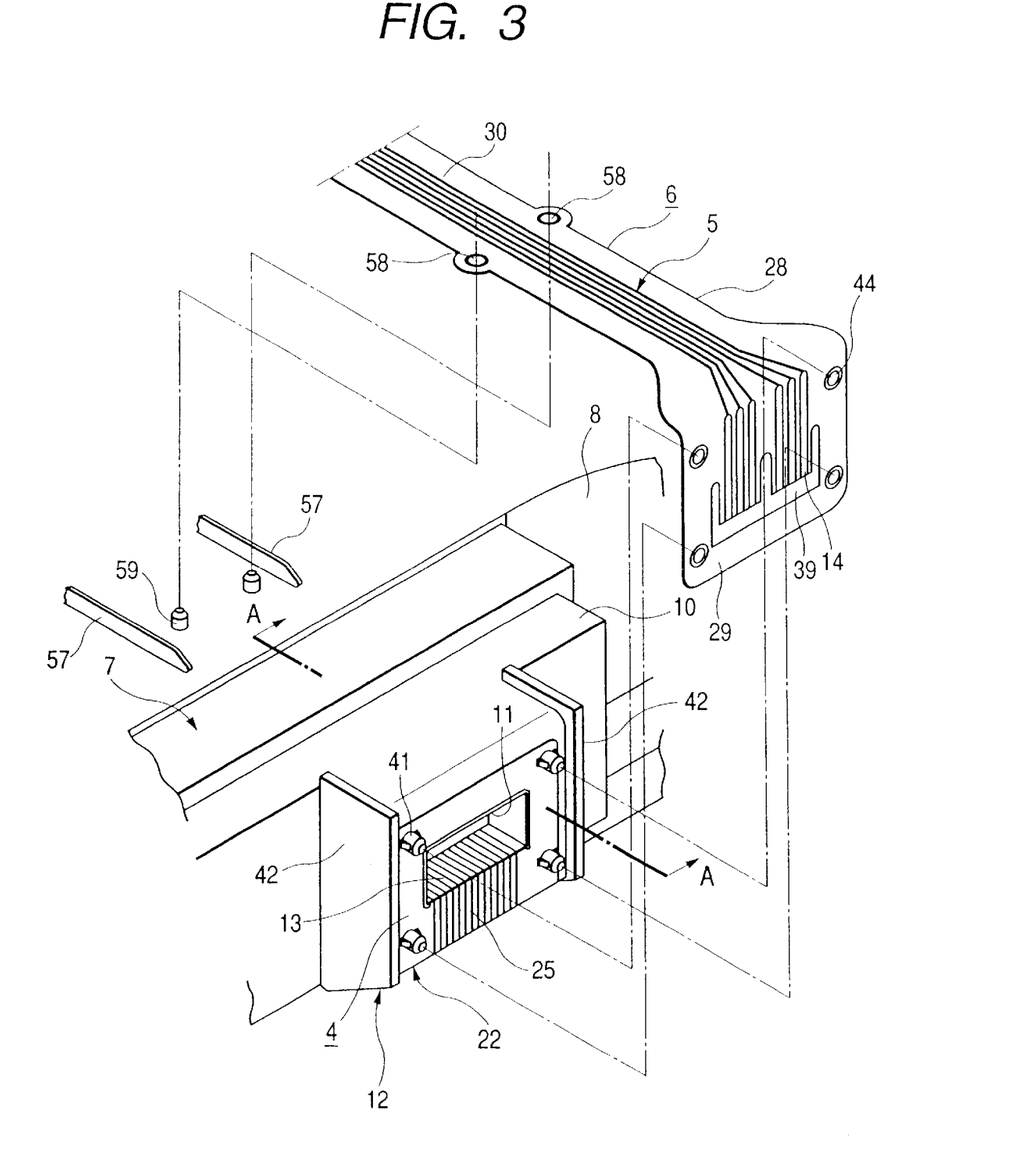
FIG. 3 is a perspective view showing the wiring structure of a second flat circuit as a partial enlarged view similar to FIG. 2.
Figure 4:
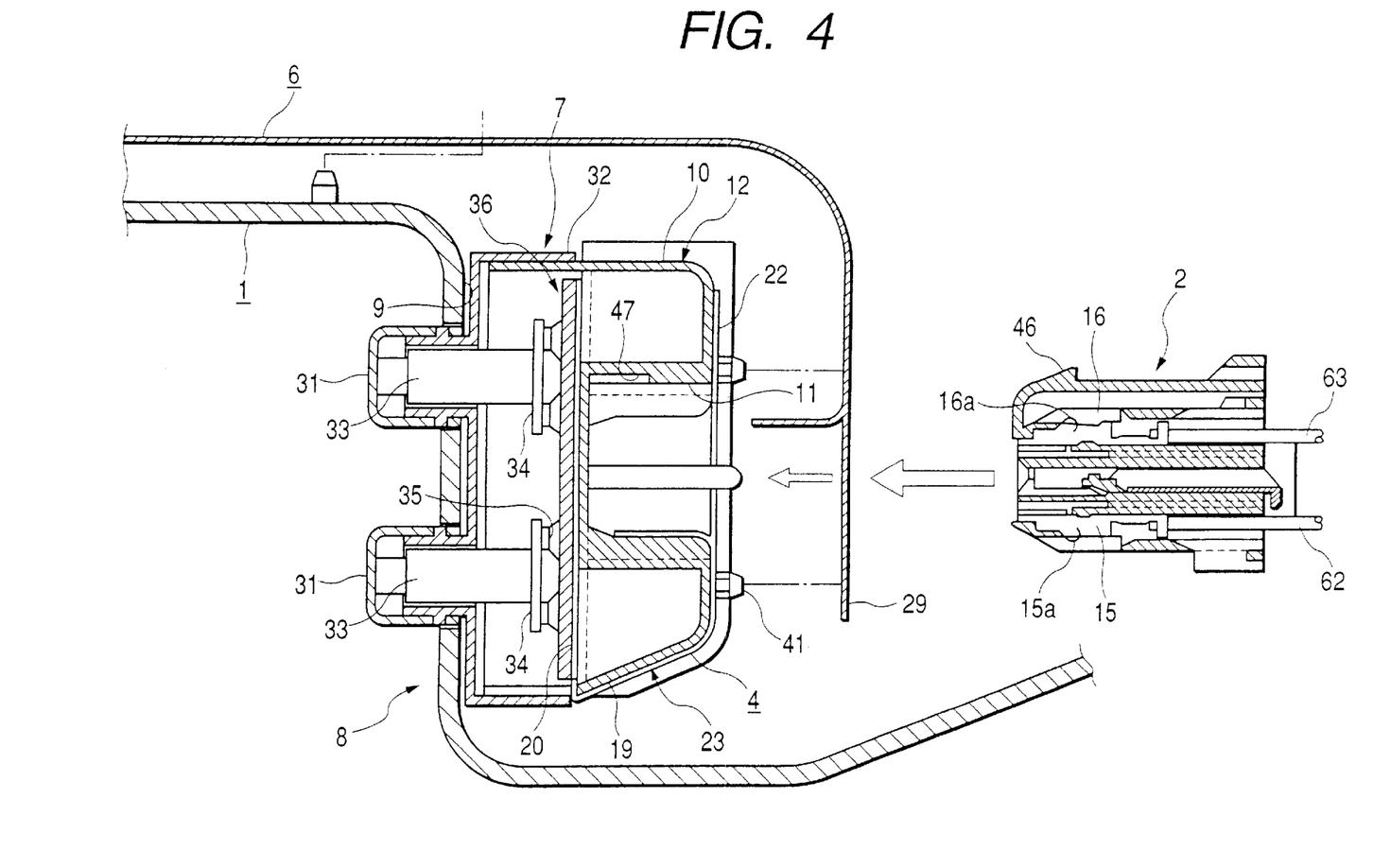
FIG. 4 is a cross-sectional view taken along the line A—A in FIG. 3, showing the connection structure of a door wire harness connector.
Figure 5:
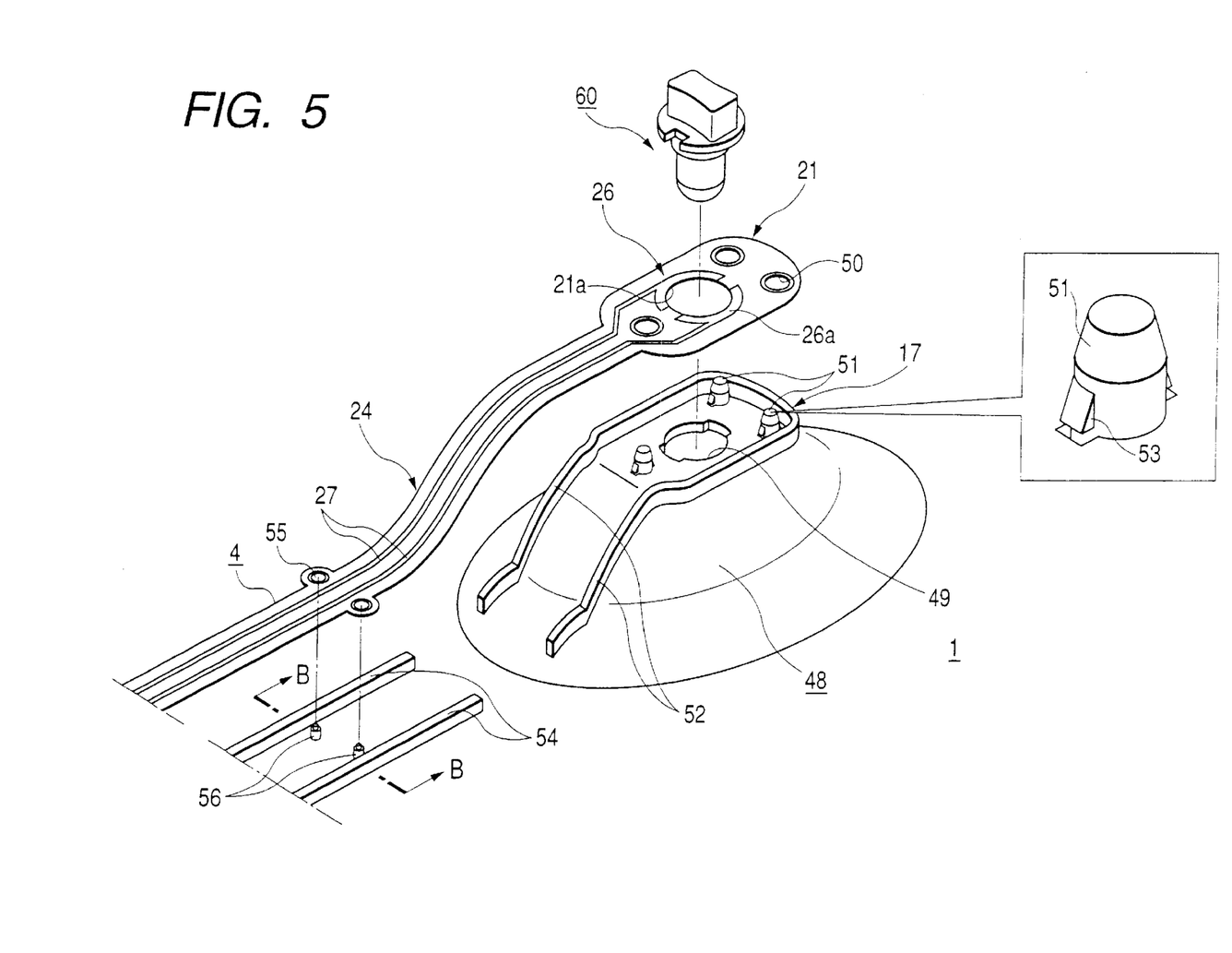
FIG. 5 is a partial enlarged view of FIG. 1, showing the wiring structure of the first flat circuit to a courtesy lamp.
Figure 6:
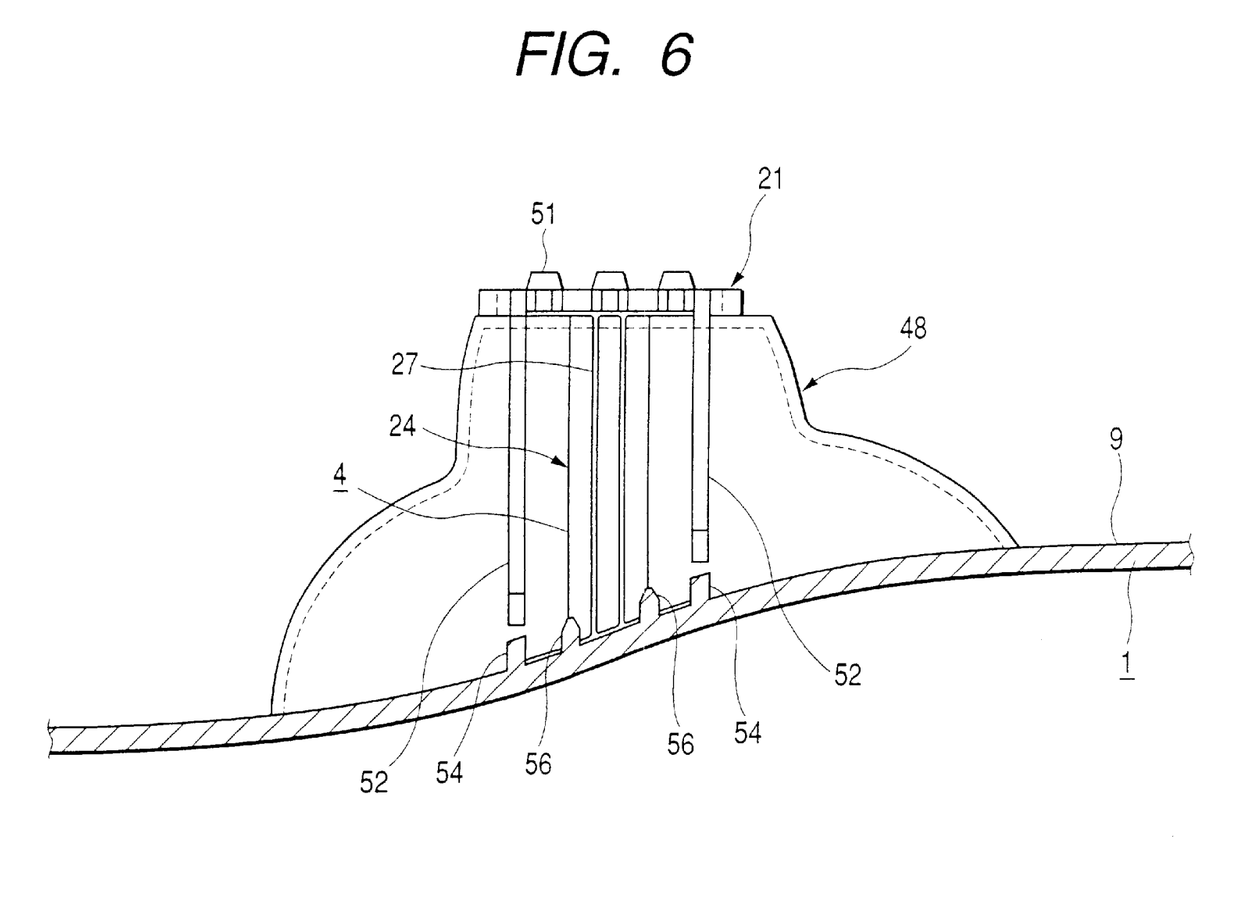
FIG. 6 is a cross-sectional view taken along the line B—B of FIG. 5.

Hereinafter, an embodiment of the invention will be explained with reference to the drawings. FIG. 1 is a perspective view of a door trim viewed from the rear face side, showing the entire configuration of a flat circuit wiring structure for a vehicle according to one embodiment of the invention. FIG. 2 is a perspective view showing the wiring structure of a first flat circuit as a partial enlarged view of FIG. 1. FIG. 3 is a perspective view showing the wiring structure of a second flat circuit as a partial enlarged view similar to FIG. 2. FIG. 4 is a cross-sectional view taken along the line A—A in FIG. 3, showing the connection structure of a door wire harness connector. FIG. 5 is a partial enlarged view of FIG. 1, showing the wiring structure of the first flat circuit to a courtesy lamp. FIG. 6 is a cross-sectional view taken along the line B—B of FIG. 5.

As shown in FIG. 1, according to the wiring structure of a flat circuit for a vehicle according to this embodiment, a first flat circuit 4 having a standard circuit 3 for electrically connecting a standard electric appliance mounted on a door trim (molded panel) 1 as a standard component and another electric appliance on the door panel side, corresponding to the appliance via a door wire harness connector 2 (see FIG. 4) provided on the inner panel side, and a second flat circuit 6 having an optional circuit 5 for electrically connecting an optional electric appliance to be mounted optionally on the door trim 1 and an electric appliance on the door panel side, corresponding to the appliance via the wire harness connector 2 are formed independently, and both circuits 4, 6 are installed on the door trim 1.

A mounting section 12 having a connector fitting part 11 to be fitted with the door wire harness connector 2 is formed integrally with a resin lower case 10, projecting from an arm rest part 8 to the door trim rear face 9, of a main switch unit (electric appliance unit) 7, one of the standard electric appliances mounted on the door trim 1. At the connector fitting part 11, an exposed conductor part 13 of the standard circuit 3 and an exposed conductor part 14 of the optional circuit 5, and terminals 15, 16 of the door wire harness connector 2 corresponding to the exposed conductor parts 13, 14 (see FIG. 4) are connected electrically.

In this embodiment, the main switch unit 7 with a power window switch for operating opening/closure of a window glass, and a door mirror switch disposed, and a courtesy lamp 17 to be turned off when the door is closed and turned on when it is opened are presented as an example of the standard electric appliances. The main switch unit 7 and the courtesy lamp 17 are connected electrically with a door control unit (not illustrated) having the power window controlling function and the courtesy lamp controlling function via the first flat circuit 4 and the door wire harness connector 2. Moreover, in this embodiment, an optional switch unit 18 with various kinds of optional switches such as a power seat switch for adjusting the position and angle of seats by driving a motor, a memory switch for storing the adjusted position and angle of the seats, a fuel lid opener switch, and a trunk lid opener switch disposed, is mounted on the door trim 1 as an optional electric appliances. The optional switch unit 18 is connected electrically with the door control unit having also the power seat controlling function for controlling a motor according to a signal from the power seat switch via the second flat circuit 6 and the door wire harness connector 2.

As shown in FIG. 4, in a flexible printed circuit board (hereinafter referred to as a flexible board) 19 of the first flat circuit 4, a main switch connecting section 20 to be connected with the main switch unit 4, a lamp connecting section 21 to be connected with the courtesy lamp 17 (see FIG. 5.), and a wire harness connecting section 22 having the exposed conductor part 13 (see FIG. 2) are formed. Moreover, the flexible board 19 is formed in a Tshape with a main circuit section 23 elongating from the connecting section 20 to the connecting section 22, and a lamp circuit section 24 stemmed from the main circuit section 23, elongating to the connecting section 21. Furthermore, in the flexible board, a standard circuit (printed circuit) 3, comprising a switch circuit face having a plurality of switch contacts formed on the main switch connecting section 20, the exposed conductor part 13 of the wire harness connecting section 22, a plurality of lead lines (signal lines) 25 elongating parallel for connecting the switch circuit face and the exposed conductor part 13, an exposed conductor part 26 formed in the lamp connecting section 21, and two lead lines (power source lines) 27 for connecting the exposed conductor parts 13, 26, is formed.

As shown in FIGS. 1 and 3, a switch connecting section (not illustrated) having a switch circuit face to be connected with the optional switch unit 18, and a wire harness connecting section 29 having the exposed conductor part 14 are formed in a flexible printed circuit board 28 of the second flat circuit 6. An optional circuit (printed circuit) 5, comprising the switch circuit face, the exposed conductor part 14, and a plurality of lead lines 30 elongating parallel, for connecting the exposed conductor part 14 and the switch circuit face, is formed in the flexible board 28.

As shown in FIGS. 1 and 4, the main switch unit 4 is assembled on the door trim 1 such that the various switches (key top) 31 including the power window switch are exposed from the arm rest part 8 to the car room side as well as a part of an upper case 32 and the lower case 10 are projected from the arm rest part 8 to the door trim rear face 9 side. The upper case 32 is fixed on the opening part of the arm rest part 8, with a plurality of push pins 33 fitted in the case 32 slidably as well as a plurality of switches 31 for pressing down the plurality of the push pins 33 assembled in the upper case 32. A disc 34 is fixed on the end part of the push pins 33. Moreover, the lower case 10 is fixed on the upper case 32 so as to hold the main switch connecting section 20 of the first flat circuit 4 with respect to a rubber mount 36 having a plurality of contacts 35. Since the push pin 33 is pressed down in the case any of the switches 31 is pressed so that the disc 34 presses down the respective two contacts 35, the contacts 35 come in contact with the corresponding contact parts of the switch circuit face of the first flat circuit 4.

Moreover, the optional switch unit 18 disposed above the main switch unit 4, is assembled in the door trim 1 such that the operation part with the power seat switch disposed is exposed to the car room side as well as the case 37 projects to the door trim rear face 9 side. Furthermore, the courtesy lamp 17 is assembled in the door trim 1 at the substantially same height with respect to the main switch unit 7 as well as away from the main switch unit 7 to the rear face of the vehicle body.

As shown in FIGS. 2 and 3, slits 38, 39 for allowing the bend of the center part having the exposed conductor parts 13, 14 are formed in the wire harness connecting sections 22, 29 of both flat circuits 4, 6. The wire harness connecting section 22 of the first flat circuit 4 is assembled on the mounting section 12 by bending the center part in the direction to be contacted with an inner face of the connector fitting part 11 so as to have the exposed conductor part 13 of the standard circuit 3 at the face side in the connector fitting part 11 with the peripheral part thereof contacted with the mounting face 40 of the mounting section 12 with the connector fitting part 11 opened (see FIG. 3). Moreover, the wire harness connecting section 29 of the second flat circuit 6 is assembled on the mounting section 12 by bending the center part in the direction to be contacted with another inner face of the connector fitting part 11 (in this embodiment, the face facing to the above-mentioned face) so as to have the exposed conductor part 14 of the optional circuit 5 at the face side with the peripheral part thereof contacted with the mounting face 40.

The mounting section 12 has a rectangular shape as well as the connector fitting part 11 is formed as a rectangular hole. Furthermore, the wire harness connecting section 22 of the first flat circuit 4 and the wire harness connecting section 29 of the second flat circuit 6 are assembled on the mounting section 12 with the center part bent in the direction contacting with the face facing to the connector fitting part 11. Accordingly, both wire harness side contacting parts 22, 29 can be fixed on the mounting section 12 by the same fixing bosses 41 on the mounting face 40.

In contrast, the door wire harness connector 2 is assembled with a plurality of door wire harnesses installed on the door panel side so as to be connected electrically with the door control unit. As shown in FIG. 4, a terminal 15 is pressed on each tip end of some of the door wire harnesses 62, and a terminal 16 is pressed on each tip end of the other door wire harness 63. The plurality of the terminals 15 are arranged in a row so as to be contacted with corresponding ones among a plurality of lead lines of the exposed conductor part 13 of the first flat circuit 4 assembled on the mounting section 12 at a contacting projection part 15a projecting outward. Similarly, the plurality of the terminals 16 are arranged in a row so as to be contacted with corresponding ones among a plurality of lead lines of the exposed conductor part 14 of the second flat circuit 6 assembled on the mounting section 12 at a contacting projection part 16a projecting outward.

According to the configuration, the lead lines of the exposed conductor parts 13, 14 of both circuits 3, 5 each at the face side in the connector fitting part 11 and the terminals 15, 16 of the door wire harness connectors 2 can be connected easily only by assembling the wire harness connecting sections 22, 29 in the mounting section 12 and fitting the door wire harness connectors 2 in the connector fitting part 11.

As shown in FIG. 2, the mounting section 12 is formed integrally with four fixing bosses 41 projecting from the mounting face 40 and right and left side walls 42 projecting from both sides of the mounting face 40 for a predetermined height for guarding the wire harness connecting sections 22, 29. Moreover, a plurality of engaging holes 43, 44 each to be engaged with the plurality of the fixing bosses 41 are formed in the wire harness connecting sections 22, 29 of both flat circuits 4, 6. Accordingly, the wire harness connecting sections 22, 29 of both flat circuits 4, 6 can be positioned and assembled on the mounting section by engaging the engaging holes 43, 44 with the fixing bosses 41 of the mounting face 40 so that the exposed conductor part 22 or both exposed conductor parts 22, 29 can be connected certainly with the terminals 15, 16 of the door wire harness connector 2 at the correct position. Moreover, both side parts of the wire harness connecting section 22 assembled on the mounting section 12 or both side parts of both wire harness connecting sections 22, 29 can be protected by the right and left side walls 42. Accordingly, lift-off of the first flat circuit 4 or both flat circuits 4, 6 due to contact of both side parts thereof with a finger of a worker can be prevented.

Moreover, locking projections 45 for securing the wire harness connecting section 22 or both of the wire harness side contacting part 22, 29 are formed in the fixing bosses 41. Accordingly, the connecting sections 22, 29 can be assembled on the mounting face 40 of the mounting section 12 certainly.

Furthermore, as shown in FIG. 4, a locking recess 47 to be engaged with a locking projection 46 provided on the outer peripheral part of the door wire harness connector 2 for securing the connector 2 is formed in the deep part of the connector fitting part 11. Accordingly, the door wire harness connector 2 can be assembled certainly on the connector fitting part 11.

As shown in FIGS. 5 and 6, a lamp body 48 of the courtesy lamp 17 is formed integrally with the door trim 1 so as to be projected to the inner panel side. A bulb mounting hole 49, a plurality of fixing bosses 51 provided in the vicinity of the mounting hole 49, each to be engaged with a plurality of engaging holes 50 provided in the lamp connecting section 21 of the first flat circuit 4, and right and left side walls 52 projecting from both sides of the lamp connecting section 21 the door trim rear face 9 for a predetermined height for guarding the lamp connecting section 21 are formed integrally on the door trim rear face 9 side of the lamp body 48. Accordingly, since the lamp body 48 is formed integrally with the door trim 1, the number of part and the number of steps of work can be cut back for the lamp body 48, and thus the cost can be reduced. Moreover, the lamp connecting section 21 can be positioned and assembled on the lamp body 48 by engaging the plurality of the engaging holes 50 with the plurality of the fixing bosses 51 provided in the vicinity of the bulb mounting hole 49. Furthermore, both side parts of the lamp connecting section 21 can be protected by the right and left side walls 52 of the lamp body 48. Accordingly, lift-off of the lamp connecting section 21 due to contact of both side parts thereof with a finger of a worker can be prevented.

Furthermore, after engaging the engaging holes 50 of the lamp connecting section 21 with the fixing bosses 51 of the lamp body 48, both sides projections (not illustrated) of a bulb 60 of the courtesy lamp 17 are fit with associated notches of the bulb mounting hole 49 so as to be inserted through the bulb insertion hole 21*a* of the lamp connecting section 21 and the bulb mounting hole 49. Then, by turning the bulb 60, the top part of the lamp body 48 is held by the both sides projections of the bulb 60 and a disc part, and thereby the bulb 60 is held by the lamp body 48 with the electrode formed on the lower face (face at the lower side in FIG. 5) of the disc part 61 of the bulb 60 directly contacting with a copper foil surface 26*a* in the vicinity of the bulb insertion hole 21*a*. Therefore, the bulb 60 can be mounted easily on the lamp body 48.

Moreover, a locking projection 53 to be engaged with the plurality of the engaging holes 50 of the lamp connecting section 21 for securing the connecting section 21 is formed in each of the plurality of the fixing bosses 51. Accordingly, the lamp connecting section 21 can be assembled certainly on the door trim rear face 9 side of the lamp body 48.

Furthermore, as shown in FIGS. 5 and 6, right and left side walls 54 projecting from both sides of the lamp circuit section 24 for a predetermined height for guarding the lamp circuit section 24, and a plurality of temporarily securing bosses 56 disposed in both side walls 54 to be engaged with the plurality of the engaging holes 55 provided in the lamp circuit for temporarily securing the lamp circuit section 24 are formed integrally in the route for installing the lamp circuit section 24 on the door trim rear face 9. According to the configuration, since the engaging holes 55 are engaged with the temporarily securing bosses 56 with the lamp circuit section 24 disposed in the right and left side walls 54, the lamp circuit section 24 can be positioned and assembled on the door trim rear face 9. Moreover, since both sides of the lamp circuit section 24 are protected by the right and left side walls 54, lift-off of the lamp circuit section 24 due to contact of both side parts thereof with a finger of a worker can be prevented.

As shown in FIGS. 1 to 3, the second flat circuit 6 elongates from the switch connecting section to be connected with the optional switch unit 18 to the wire harness connecting section 29 to be mounted on the connector fitting part 11. Right and left side walls 57 projecting from both sides of the circuit for a predetermined height for guarding the second flat circuit 6, and a plurality of temporarily securing bosses 59 disposed in both side walls 57 to be engaged with the plurality of the engaging holes 58 provided in the second flat circuit 6 for temporarily securing the second circuit are formed integrally in the route for installing the second flat circuit 6 on the door trim rear face 9. According to the configuration, since the engaging holes 58 are engaged with the temporarily securing bosses 59 with the second flat circuit 6 disposed in the right and left side walls 57, the second circuit 6 can be positioned and assembled on the door trim rear face 9. Moreover, since both side parts of the second flat circuit 6 are protected by the right and left side walls 57, lift-off of the second flat circuit 6 due to contact of both side parts thereof with a finger of a worker can be prevented.

According to the flat circuit wiring structure according to the embodiment with the above-mentioned configuration, since the first flat circuit 4 with the standard circuit 3 formed, and the second flat circuit 6 with the optional circuit 5 formed are provided independently, only the circuit to be electrically connected with the standard electric appliances actually mounted is formed but without a circuit for the electric appliances to be mounted optionally in the first flat circuit 4 to be connected with the standard electric appliances mounted on the door trim 1 such as the main switch unit 7 with a power window switch disposed. Thereby, the circuit space can be small for that so that the first flat circuit 4 can be small. Further, since the standard circuit 3 is not connected with any other mating circuit, it is not necessary to provide an optional connection part to be protected and the protection work can be omitted. Therefore, the cost can be reduced.

Moreover, according to this embodiment, the exposed conductor parts 13, 14 of the standard circuit 3 and the optional circuit 5 and the door wire harness connector 2 are connected electrically by the connector fitting part 11 of the mounting section 12 formed integrally with the resin lower case 10 projecting to the door trim rear face 9 side of the main switch unit 7 mounted on the door trim 1. Therefore, the exposed conductor parts 13, 14 of the two circuits 3, 5 and the door wire harness connector 2 can be connected at one point as well as the mounting section 12 having the connector fitting part 11 can be produced integrally with the lower case 10 with a good accuracy without the need of adding a connecting section integrally with the lower case 10 by resin-molding.

According to the above-mentioned embodiment, the main circuit section 23 of the first flat circuit 4 comprises the main switch connecting section 20 assembled in the main switch unit 7 mounted on the arm rest part 8 of the door trim 1 as shown in FIG. 4, the wire harness connecting section 22 to be assembled with the mounting section 12 integrally formed with the lower case 10 of the main switch unit 7, and the part elongating along the lower case 10 and the outer face of the mounting section 12 between the connecting sections 20, 22 as shown in FIG. 4. Since the distance from the outlet of the main circuit section 23 formed between the cases 10, 32 to the mounting section 12 is slight, the length of the main circuit section 23 can be considerably short, and thus the first flat circuit 4 having the main circuit section 23 and the lamp circuit section 24 can be small as a whole.

Although the structure with the two standard and optional flat circuits 4, 6 installed on the door trim 1 has been explained in the above-mentioned embodiment, the invention is not limited thereto. Since the connector fitting part 11 of the mounting section 12 has four inner faces, also in the case three flat circuits are formed independently or four flat circuits are formed independently, the exposed conductor parts of the flat circuits and the door wire harness connector 2 can be connected electrically by the connector fitting part 11, that is, at one point similar to the case of the above-mentioned embodiment. Specifically, in the case three flat circuits are formed independently, they can be assembled on the mounting section 12 with the center part of each of the three exposed conductor parts bent in the direction so as to be contacted with three different inner faces from the four inner faces of the connector fitting part 11. In this case, the door wire harness connector 2 can be provided with three sets of terminal rows arranged in the direction each along the three inner faces so as to be contacted with the three exposed conductor parts. Similarly, in the case four flat circuits are formed independently, they can be assembled on the mounting section 12 with the center part of each of the four exposed conductor parts bent in the direction so as to be contacted with the four different inner faces of the connector fitting part 11. In this case, the door wire harness connector 2 can be provided with four sets of terminal rows arranged in the direction each along the four inner faces so as to be contacted with the four exposed conductor parts.

Furthermore, the invention is not limited to the above-mentioned embodiment, but can be adopted in a flat circuit wiring structure for a vehicle explained below.

That is, according to the flat circuit wiring structure for a vehicle, one flat circuit having a circuit for electrically connecting an electric appliance mounted on a door trim 1 and an electric appliance mounted on a door panel via a door wire harness connector 2 provided on the inner panel side, is installed on the door trim 1. A mounting section 12 having a connector fitting part 11 to be fitted with the door wire harness connector 2 is formed integrally with a resin lower case 10 projecting to the door trim rear face 9 side of a main switch unit 7, one of the electric appliances mounted on the door trim 1 so that the wire harness side exposed conductor part of the flat circuit and the terminals of the door wire harness connector 2 are connected electrically by the connector fitting part 11.

According to the configuration, the wire harness side exposed conductor part in the circuit of the flat circuit installed on the door trim 1 and the door wire harness connector 2 provided on the door panel side are connected electrically by the connector fitting part 11 of the mounting section 12 formed integrally with the resin lower case 10 projecting to the door trim rear face 9 side of the main switch unit 7 mounted on the door trim. Therefore, the mounting section 12 having the connector fitting part 11 for connecting the wire harness side exposed conductor part and the door wire harness connector 2 can be produced integrally with the lower case 10 by resin molding with a good accuracy without the need of producing a connecting section independently from the door trim. Moreover, since the circuit for electrically connecting the electric appliance on the door trim side and the electric appliance on the door panel side via the door wire harness connector is formed in the flat circuit, the invention can be adopted not only in doors of vehicles having only a main switch unit 7 including a power window switch and a plurality of electric appliances such as a courtesy lamp 17 mounted on the door as the standard components, but also in doors of high grade vehicles having, in addition to those electric appliances, optional switches such as a power seat switch mounted on the door trim as the standard components. Therefore, since a connecting section on the door trim side for connecting the flat circuit installed on the door trim and the door wire harness on the door panel side can be eliminated so as to achieve the cost reduction.

Still further, the invention is not limited to the above-mentioned embodiments, but can be adopted also to a flat circuit wiring structure for a vehicle for installing on a molded panel a plurality of flat circuits including a first flat circuit with a standard circuit for electrically connecting a standard electric appliance to be mounted on the molded panel such as an instrument panel of the vehicle and an electric appliance such as a control unit disposed on the vehicle main body side (another electric appliance) via a wire harness connector, and a second flat circuit with an optional circuit for electrically connecting an optional electric appliance to be mounted on the molded panel and the other electric appliance via the wire harness connector, provided independently.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A wiring structure for a vehicle, comprising:
    at least one first electric appliance provided on a molded panel in the vehicle;
    at least one second electric appliance provided on the molded panel;
    a connector provided with terminals to which wire harnesses are connected;
    a mount section integrally formed with the molded panel and including a polygonal insertion hole into which the connector is inserted;
    at least one first flat circuit including a first connecting portion connected to the at least one first electric appliance, and a second connecting portion attached on at least one inner wall of the polygonal insertion hole while exposing conductors of the circuit; and
    at least one second flat circuit including a first connecting portion connected to the at least one second electric appliance, and a second connecting portion attached on at least one of the other inner walls of the polygonal insertion hole while exposing conductors of the circuit,
    wherein the at least one first and second electric appliances are electrically connected via the connector when the connector is inserted into the insertion hole by contacting the respective terminals with the respective exposed conductors.

2. The wiring structure as set forth in claim 1, wherein the first electric appliance is an electric appliance provided as standard equipment and the second electric appliance is an electric appliance provided optionally; and
    wherein the first flat circuit includes a standard circuit for the first electric appliance and the second flat circuit includes an optional circuit for the second electric appliance.

3. The wiring structure as set forth in claim 1, wherein the mount section includes a mount face surrounding the insertion hole;
    wherein the respective second connecting portions of the first and second flat circuits are provided with a slit for defining a foldable portion on which the conductor is exposed; and
    wherein the respective second connecting portions of the first and second flat circuits are laminated on the mount face, and then the respective foldable portions are folded into the respective inner walls of the insertion hole to be attached thereon.

4. The wiring structure as set forth in claim 3, wherein a plurality of bosses fit with a plurality of through holes formed on the respective second connecting portions of the first and second flat circuits.

5. The wiring structure as set forth in claim 4, wherein a retaining member is formed on the respective bosses for retaining the respective second connecting portions of the first and second flat circuits onto the mount face.

6. The wiring structure as set forth in claim 4, wherein side walls are formed on the mount face of the mount section so as to situate both sides of the respective second connecting portions of the first and second flat circuits.

7. The wiring structure as set forth in claim 1, wherein a first retaining member is provided on the connector; and a second retaining member engaged with the first retaining member is provided on a part of the inner walls of the insertion hole to retain the connector inside the insertion hole.

8. The wiring structure as set forth in claim 1, wherein the mount section is provided as a part of a main switch unit mounted on the door trim of the vehicle;

wherein the first electric appliance includes a courtesy lamp unit and a door control unit mounted on a door panel of the vehicle for opening/closing a window glass in accordance with a signal generated by operating a power window switch provided with the main switch unit.

9. The wiring structure as set forth in claim 8, wherein the first flat circuit includes signal lines for carrying the signal to the door control unit, and a power supply line for electrically connecting the courtesy lamp unit with an associated terminal of the connector.

10. The wiring structure as set forth in claim 9, wherein the courtesy lamp unit includes a bulb, and a lamp body integrally formed with the door trim while including an insertion hole into which the bulb is inserted and a mount face on which the first connecting portion of the first flat circuit is attached; and wherein a plurality of bosses are protruded from the mount face, which are fit with a plurality of through holes formed on the first connecting portion.

11. The wiring structure as set forth in claim 10, wherein a retaining member is formed on the respective bosses for retaining the first connecting portion of the first flat circuit onto the mount face.

12. The wiring structure as set forth in claim 10, wherein side walls are formed on the mount face of the lamp body so as to situate both sides of the first connecting portion of the first flat circuit.

13. The wiring structure as set forth in claim 9, wherein the first flat circuit includes a main circuit section extending from the second connecting portion to a third connecting portion connected with the main switch unit, and a lamp circuit section branchingly extending from the second connecting portion to the first connecting portion.

14. The wiring structure as set forth in claim 13, wherein a plurality of bosses fit with a plurality of through holes formed on the lamp circuit section are protruded from the door trim on which the lamp circuit section is disposed.

15. The wiring structure as set forth in claim 14, wherein side walls are formed on the door trim so as to situate both sides of the lamp circuit section.

16. The wiring structure as set forth in claim 1 wherein the second electric appliance includes an optional switch unit provided with a power seat switch.

17. The wiring structure as set forth in claim 16, wherein a plurality of bosses fit with a plurality of through holes are formed on the second flat circuit are protruded from a door panel on which the second flat circuit is disposed.

18. The wiring structure as set forth in claim 16, wherein side walls are formed on the door panel so as to situate both sides of the second flat circuit.

* * * * *